United States Patent [19]
Allan et al.

[11] Patent Number: 5,946,313
[45] Date of Patent: Aug. 31, 1999

[54] MECHANISM FOR MULTIPLEXING ATM AAL5 VIRTUAL CIRCUITS OVER ETHERNET

[75] Inventors: David Ian Allan; Liam M. Casey, both of Ottawa; Andre J. Robert, Woodlawn, all of Canada

[73] Assignee: Northern Telecom Limited, Montreal, Canada

[21] Appl. No.: 08/821,145

[22] Filed: Mar. 20, 1997

[51] Int. Cl.[6] .................................................. H04Q 11/04
[52] U.S. Cl. ........................................ 370/397; 370/401
[58] Field of Search .................................. 370/397, 395, 370/398, 401, 471, 473, 474

[56] References Cited

U.S. PATENT DOCUMENTS

| | | | |
|---|---|---|---|
| 5,457,681 | 10/1995 | Gaddis et al. | 370/56 |
| 5,490,140 | 2/1996 | Abensour et al. | 370/397 |
| 5,490,141 | 2/1996 | Lai et al. | 370/397 |
| 5,732,071 | 3/1998 | Saito et al. | 370/401 |

FOREIGN PATENT DOCUMENTS

| | | | |
|---|---|---|---|
| PCT/CA95/00029 | 1/1995 | WIPO | H04L 12/46 |
| WO95/20282 | 7/1995 | WIPO | H04L 12/46 |

OTHER PUBLICATIONS

Castro, R. et al., "Support of Data Communications in an ATM LAN", Information Networks and Data Communication, Proceedings of the IFIP TC6 Int. Conference on Information Networks and Data Communication, Madeira Island, Portugal, Apr. 18–21, 1994, pp. 277–295, XP000593298.

Smith, J.C., "10MBPS to 155MBPS ATM Using the IDT SARAMTM as a Concentrator Brouter Core", Wescon '94, Western Electronic Show and Convention, Anaheim, Sep. 27–29, 1994, pp. 495–502, XP000532615.

Mirchandani, V. et al., "An Internetworking Architecture for Integrated Voice and Data Communications", Proceedings of the regional 10 Annual International Conference, Singapore, Aug. 22–26, 1994, vol. 2, Conf. 9, pp. 749–753, XP000528218.

Camarda, P. et al., "A Router for the Interconnection of Ethernet Local Area Networks Via an ATM Network", Proceedings of the International Conference on Integrated Broadband Services and Networks, London, Oct. 15–18, 1990, pp. 283–288, XP000410619.

Paone, R. et al., "Feasibility Model of a Flexible Business Customer Premises Network", Electronics and Communication Engineering Journal, vol. 4, No. 1, Aug. 1, 1992, pp. 215–224, XP000307899.

*Primary Examiner*—Chi H. Pham
*Assistant Examiner*—Maikhanh Tran
*Attorney, Agent, or Firm*—Aprilia U. Diaconescu

[57] ABSTRACT

The invention provides for a E-Mux and a method for encapsulating/segmenting ATM cells into/from an Ethernet frame at the boundary between an ATM and an Ethernet network. An Ethernet end-station on the E-Mux is addressed using multiple MAC level identifiers, which are dynamically assigned according to the ATM virtual circuits which terminate on that end station, and have only transitory significance on the Ethernet. A unique ATM OUI identifies the frames carrying ATM-traffic.

12 Claims, 10 Drawing Sheets

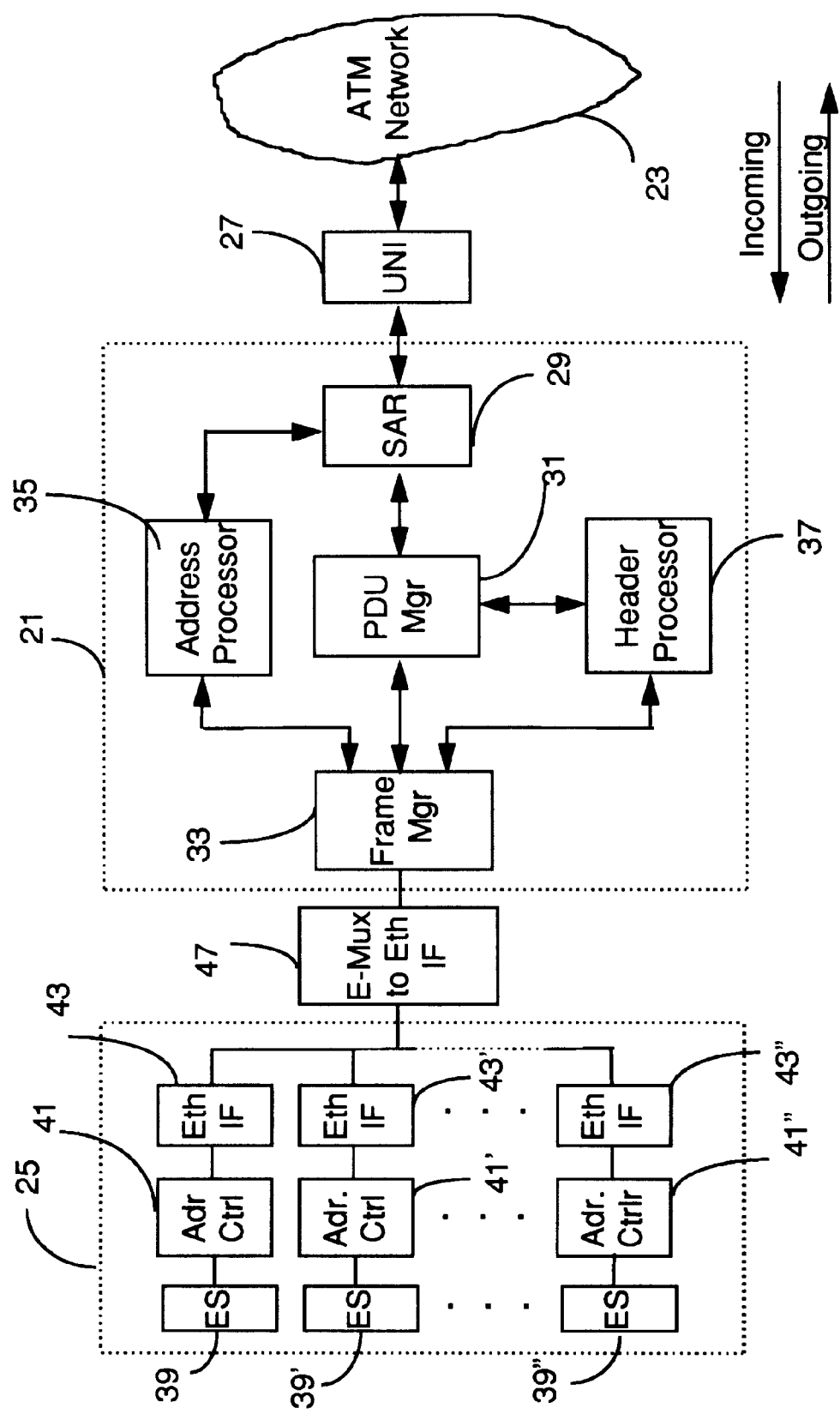

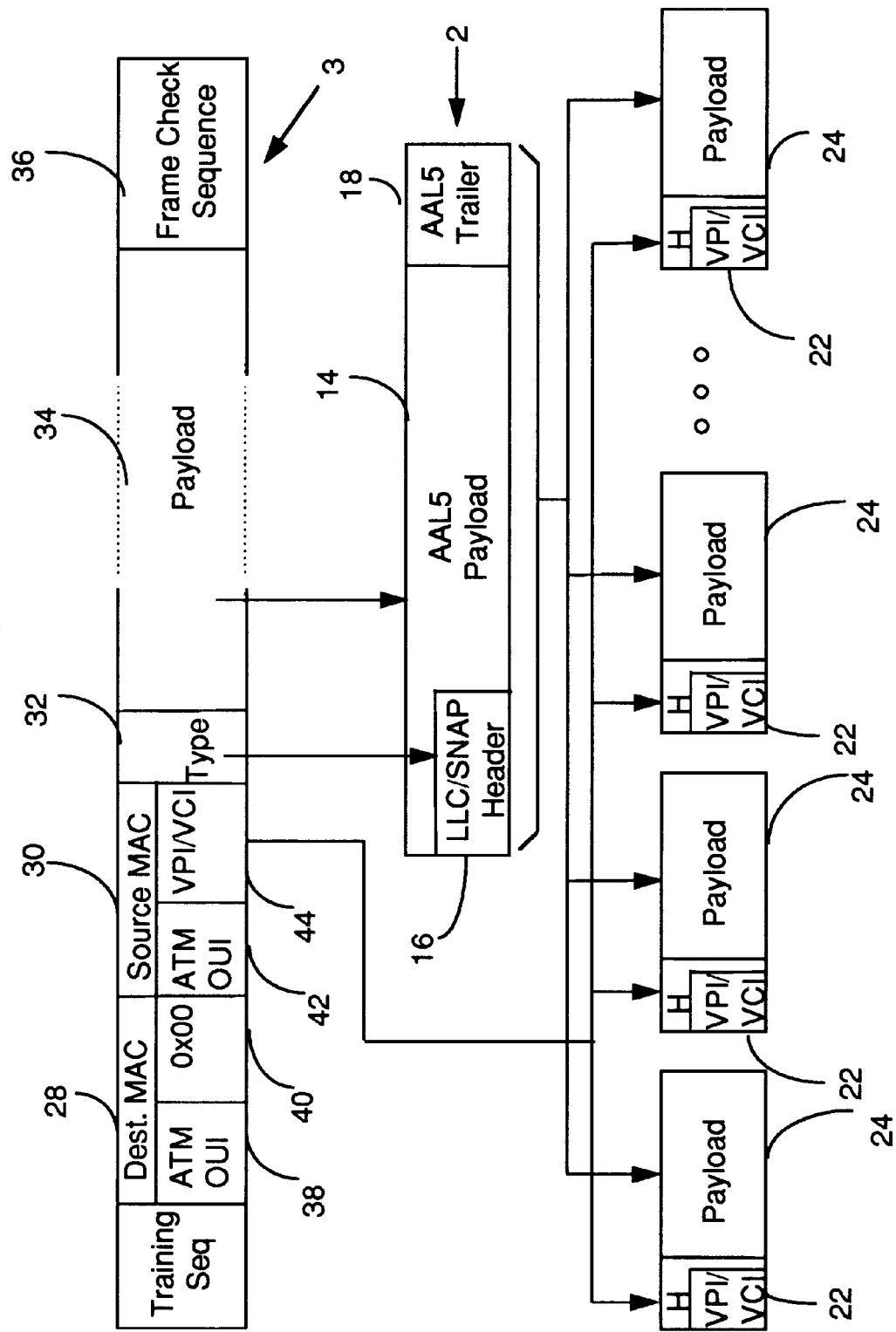

MECHANISM FOR MULTIPLEXING ATM AAL5 VIRTUAL CIRCUITS OVER ETHERNET

FIELD OF THE INVENTION

The invention is directed to a system and method for carrying ATM network information over a local area network (LAN), and more particularly to a mechanism for multiplexing ATM AAL5 virtual circuits over Ethernet.

BACKGROUND OF THE INVENTION

The asynchronous transfer mode (ATM) forms the basis for switching in broadband networks. ATM is a connection oriented data transport which is media independent. The key feature of ATM is the segmentation of data into fixed length units of data referred to as cells. Each cell is separately steered at each ATM switch via an identifier of local significance to the local transport leg provided in the header of each cell. The identifiers are reassigned during the transit of a cell from an input port to an output port on a switch. The identifier carried between a switch and an end system is 24 bits in length. For an ATM user network interface (UNI), this is a concatenation of a 16 bit virtual circuit identifier (VCI) and an 8 bit virtual path identifier (VPI).

This routing mechanism differs significantly from other networks, in that there is only one identifier specifying a local path vs. source and destination information. This path information in itself is insufficient to uniquely identify the real source and destination for the payload and therefore the connection is set up via signalling. As such, connection to a remote end-station is requested and upon connection set-up, the network informs the end station what the local identifier of the connection is.

Ethernet is a connectionless LAN technology designed for data applications in which all stations on the network share the communication medium. This medium, which could be twisted pairs, fiber, or coaxial cables, is shared in a peer to peer fashion. All devices on the Ethernet can be reached by a single transmission of data. Ethernet operates typically at 10 Mbs and the data are sent in the form of Ethernet "frames".

There is no central arbitrator of bandwidth to administer media access on an Ethernet. Every time an Ethernet end station sends message, it listens to the media to ensure that it is not in use by another station. If this is true, the end station commences sending its own message. During the message send phase, the end station monitors the media to detect if another station has also commenced sending at the same time. The minute delays imposed by the speed of light permit a relatively large window wherein multiple stations can believe that the media is idle, and therefore can commence sending an Ethernet frame. If the end station detects a collision, i.e. what it hears does not match what it sends, it switches to sending a short "jabber" sequence to ensure that all colliding end stations detect that contention has occurred. All end-stations detecting a collision will wait a random interval and will then retry sending their frame, once again applying the same rules to determine success, and to free up the channel as quickly as possible when a collision occurs. Additional error detection is built into each frame to ensure that errored frames are not propagated.

Ethernet end stations are addressed globally and uniquely by a 48 bit media access control (MAC) address. The MAC address is comprised of a 24 bit Organization Unique Identifier (OUI) and a 24 bit end station identifier (ID). OUI is a globally administered numbering plan which comprises a portion of a number identifying the organization administering the remainder of the number, which is IEEE for Ethernet. The ID is a unique identifier that a manufacturing organization can provide to all equipment that it manufactures. Further, this identifier is unique and staticaly assigned and well known to the station. Certain Ethernet addresses are reserved for broadcast and multicast to all end-stations on the segment and for diagnostic purposes.

An Ethernet connected end station receives all data broadcast onto the media. By convention, the end station discards all traffic not directed to itself, all, or a subset of end stations, as identified in the destination MAC address.

All major emerging communication technologies rest on the layers of the OSI model. The OSI model defines a physical layer which specifies the standards for the transmission medium, a data link layer (layers 2 and 3) and a network layer (layers 4 to 7). Thus, in many cases, Ethernet operates on FDDI (fiber distributed data interface) physical layer, and the MAC layer, placed on top of FDDI, comprises the data layer. ATM operates on SONET, copper, twisted pairs, FDDI as physical layer, and the data layer is subdivided into an ATM layer and an ATM adaptation layer (AAL) providing the convergence function (called also convergence sublayer CS). Whatever the implementation of the AAL at the UNI, the ATM network is not concerned with the AAL operations, the ATM bearer service is masked from the convergence function.

It has become evident that LAN shared bus architecture is insufficient to meet the demands of applications that require more bandwidth, and that LANs are beginning to become a bottleneck in computing environments. For this reason, more economic local interfaces such as a Frame-Relay version (FUNI) and an Ethernet version, Cells-in-Frames (CIF), are used in the access network. In both cases, the separation of data into cells is deferred until within the network, but the higher level information is carried to the end station. In addition, according to the CIF version the AAL5, PDUs are pre-packaged at the end station and this implies changes in HW and SW at each Ethernet connected end station.

Switched Ethernet technology, developed to provide more capacity to an end-user, does not relay on shared medium, it rather provides point-to-point bandwidth between the user station and the switch, so that instead of sharing a 10 Mbit/s medium, the user gets a dedicated 10 Mbits/s medium. As Ethernet hubs and switches are growing in use, they become an inexpensive means to provide more bandwidth to workstations. A switched Ethernet network is more flexible, in that it may include stations that are using a port at a given full rate, stations that share a port, or stations that have access to more than one port.

However, switched Ethernet provides only limited bandwidth and supports data traffic only. A more efficient solution for bursty traffic is needed. There is also a need to simplify and standardize the access link while also obtaining protection of the access traffic.

Although ATM provides a very rich environment with numerous traffic classes and the ability to multiplex many data streams with different handling requirements together, this functionality is mainly required in the network backbone. It is sought that ATM networks will be used by more general class end stations for delivering multi-media services. However, in the short term, the extra bandwidth and cost of ATM interfaces is probably not justified for general class end stations, such as desktop computers. It is possible to built ATM switches with lower speed ATM interfaces, but this solution presents a serious deployment problem in that it requires replacement of the substantial installed base of shared media LAN wiring and adapter cards.

An ATM-Ethernet concentrator is disclosed in U.S. Pat. No. 5,457,681 (Gaddis et al., issued on Oct. 10, 1995 and assigned to Washington University), which provides an interface between an ATM network and a plurality of Ethernet segments. Each Ethernet frame transmitted by any of the Ethernet segments is fragmented into a sequence of ATM cells, which are transmitted by an Ethernet controller associated with the respective segment over the ATM network and delivered to the interconnected Ethernet controllers. When the cells are received, the controller re-assembles them into frames and transmits the frames over the respective Ethernet segment to the end stations. While this patent partially addresses the problems of bandwidth and cost, it does not provide a method and system for transmitting ATM cells in Ethernet frames, for taking advantage of the ATM capabilities.

There is a need to provide an improved network communication system with minimal displacement of existing network components, capable of providing large bandwidth to the end stations for data, video and voice traffic, and providing LAN access to switched point-to-point WAN links.

International application No. PCT/CA95/00029 (WO 95/20282) (by Burwell et al. published on Jul. 27, 1995 and assigned to Newbridge Networks Corporation) discloses a communication network comprising ATM switches interfaced with LANs, the ATM cells being encapsulated in LAN frames and being delivered in encapsulated form over the Ethernet LAN direct to the end station. In another embodiment, the LAN interface adapter of the end station provide bridging, network layer functions and LAN emulation functions to permit transparent communication between the end stations over the ATM network. The interface adapter, also defined as a "ridge (bridge/router) creates frames from ATM cells and vice-versa.

However, the method disclosed in the above patent layers ATM carriage on top of the Ethernet layer. This is to say, ATM information only appears within the Ethernet payload, imposing an extra layer of indirection and frame processing on ATM handing at the LAN/WAN boundary.

SUMMARY OF THE INVENTION

It is an object of this invention to provide a mechanism for transmitting ATM cells in Ethernet frames for interworking of ATM backbone networks with the large base of legacy equipment, and for re-establishing access to an ATM network for a LAN.

It is another object of the invention to provide an addressing convention for carriage of ATM over Ethernet to a specified end station.

This invention is based on the fact that although an Ethernet MAC address is normally globally unique for universal interoperability, it does not absolutely have to be for a dosed Ethernet to work. Uniqueness of the address within the Ethernet broadcast domain itself is necessary. According to this invention, an Ethernet end station is allowed to assume multiple MAC level identifiers on a single Ethernet interface. These identifiers which are dynamically assigned, have only transitory significance on the Ethernet.

Accordingly, the invention provides a multiplexer (E-Mux) for encapsulating ATM cells into a LAN frame, comprising a segmentation and reassembly unit for receiving a plurality of incoming ATM cells with a LAN destination address and generating an ATM adaptation layer 5 (AAL5) protocol data unit (PDU); a PDU manager for receiving the AAL5 PDU and extracting an AAL5 payload; a header processor for extracting a traffic type indicator from the header of the PDU; an address processor for extracting the LAN destination address from the header of an incoming ATM cell; and a frame manager for receiving the traffic type indicator, the AAL5 payload and the LAN destination address and generating an incoming LAN frame.

The invention also provides a multiplexer (E-Mux) for segmenting a LAN frame into a plurality of ATM cells, comprising: a frame manager for receiving an outgoing LAN frame with an ATM destination address and de-assembling it into a traffic type indicator, an AAL5 payload and an ATM destination address; a header processor for receiving the traffic type indicator from the frame manager; a PDU manager for receiving the AAL5 payload and the traffic type indicator and generating an ATM adaptation layer 5 (AAL5) protocol data unit (PDU); an address processor for receiving the ATM destination address from the frame manager; and a segmentation and reassembly unit for receiving the PDU and the ATM destination address generating a plurality of ATM cells with the ATM destination address.

According to another aspect of the invention, there is provided a telecommunication network comprising a LAN with a plurality of end-stations connected over a transmission medium and an ATM network, comprising: a multiplexer (E-Mux) for encapsulating a plurality of ATM cells received from the ATM network into an incoming LAN frame and for segmenting a LAN frame received from the LAN network into a plurality of outgoing ATM cells; an E-Mux-to-LAN interface for adapting the transmission format of the LAN frame for transmission over the connection medium of an LAN network; an ATM-to-E-Mux interface for adapting the transmission format of the ATM cells received from an ATM network for processing by the E-Mux; an address controller at each end station for forwarding the incoming LAN frame to the end station when a destination address comprised in the destination MAC field of the LAN frame is recognized by the address controller, and for inserting an ATM destination address into the source MAC field of the outgoing frame.

A method for transmitting information from an ATM network to an Ethernet network using an E-Mux is also disclosed, the method performing the steps of: establishing connection between an ATM switch of the ATM network and an end station of the Ethernet network based on a VPI/VCI destination address in the header of an incoming ATM cell; receiving a plurality of incoming ATM cells with the destination address, and generating an ATM adaptation layer 5 (AAL5) protocol data unit (PDU) with a segmentation and reassembly unit; extracting an AAL5 payload from the PDU with a PDU manager; extracting a traffic type indicator from the header of the PDU with a header processor; generating with a frame manager an incoming Ethernet frame using the traffic type indicator, the AAL5 payload and the destination address; and transmitting the Ethernet frame over the Ethernet network to the end station according to the destination address.

According to still another aspect of the invention, there is provided a method for transmitting information from an Ethernet network to an ATM network using an E-Mux performing the steps of: establishing connection between an end station of the Ethernet network and an ATM switch of the ATM network based on a VPI/VCI destination address provided by the end station; generating an outgoing Ethernet frame at the end station and transmitting same to the E-Mux; extracting from the Ethernet outgoing frame a traffic type indicator, a frame payload and a source address, with a frame manager; generating an ATM adaptation layer 5 (AAL5) protocol data unit (PDU) with a segmentation and reassembly unit from the frame payload and a traffic type indicator extracted from the type field of the outgoing frame with a header processor; segmenting the PDU into a plurality of outgoing ATM cells and inserting a VPI/VCI destination address in the header of the cells from an address processor.

Advantageously, the system and method of the invention provides a highly efficient carriage of ATM information to an end station using actual MAC address space in the Ethernet frame.

Because the frames are not pre-packaged into AAL5 PDUs at the end station, but at the E-Mux, the system of the invention is efficient, as custom hardware to perform this function does not need to be deployed at each Ethernet connected end station, and the end station software is not burdened with this task. Custom hardware to perform SAR (segmentation and reassembly) function is built into the E-Mux.

Still another advantage of the invention is that legacy Ethernet can coexist with ATM LAN to UNI traffic. ATM intelligence can be distributed in such a LAN segment. For meshed PVC/UBR type connections, standard packet formats and driver interfaces may be used between layer 3 and the Ethernet interface, making the invention applicable to various LAN technologies. No additional information needs to be propagated outside the system of the invention. Therefore, this permits the system to be tailored as an application specific ATM to Ethernet interface.

Still another advantage of the invention is that the Ethernet frame is efficiently used since the ATM routing information is embedded in the Ethernet MAC addressing field. No additional ATM header within the Ethernet payload is necessary, since the entire ATM semantics is not carried to the end station. This does not preclude, however, additional semantics being packaged in a separate header in the Ethernet frame.

ATM virtual circuit (VC) address mapping is carried forward into the Ethernet domain. Intermediate steps are not required to map Ethernet MAC to VC, as VC information flows end-to-end. For uncommitted bit rate (UBR) data services, only the ATM path identifier need to be carried forward across an Ethernet LAN.

As a result, Ethernet traffic can coexist-exist with ATM LAN to UNI traffic. As indicated above, each Ethernet connected station may assume multiple IDs on the LAN at the MAC level. Thus, for traditional, non-ATM traffic, it retains the manufacturers MAC address built into the Ethernet interface at the factory. For ATM traffic, it assumes one or more IDs depending on the ATM virtual circuits which ultimately terminate at that particular end station interface.

BRIEF DESCRIPTION OF THE DRAWINGS

The foregoing and other objects, features and advantages of the invention will be apparent from the following more particular description of the preferred embodiments, as illustrated in the appended drawings, where:

FIG. 2 shows the block diagram of the E-Mux;

FIG. 3B shows the processing of an outgoing Ethernet frame to produce ATM cells;

DESCRIPTION OF THE PREFERRED EMBODIMENT

Figure 1A:
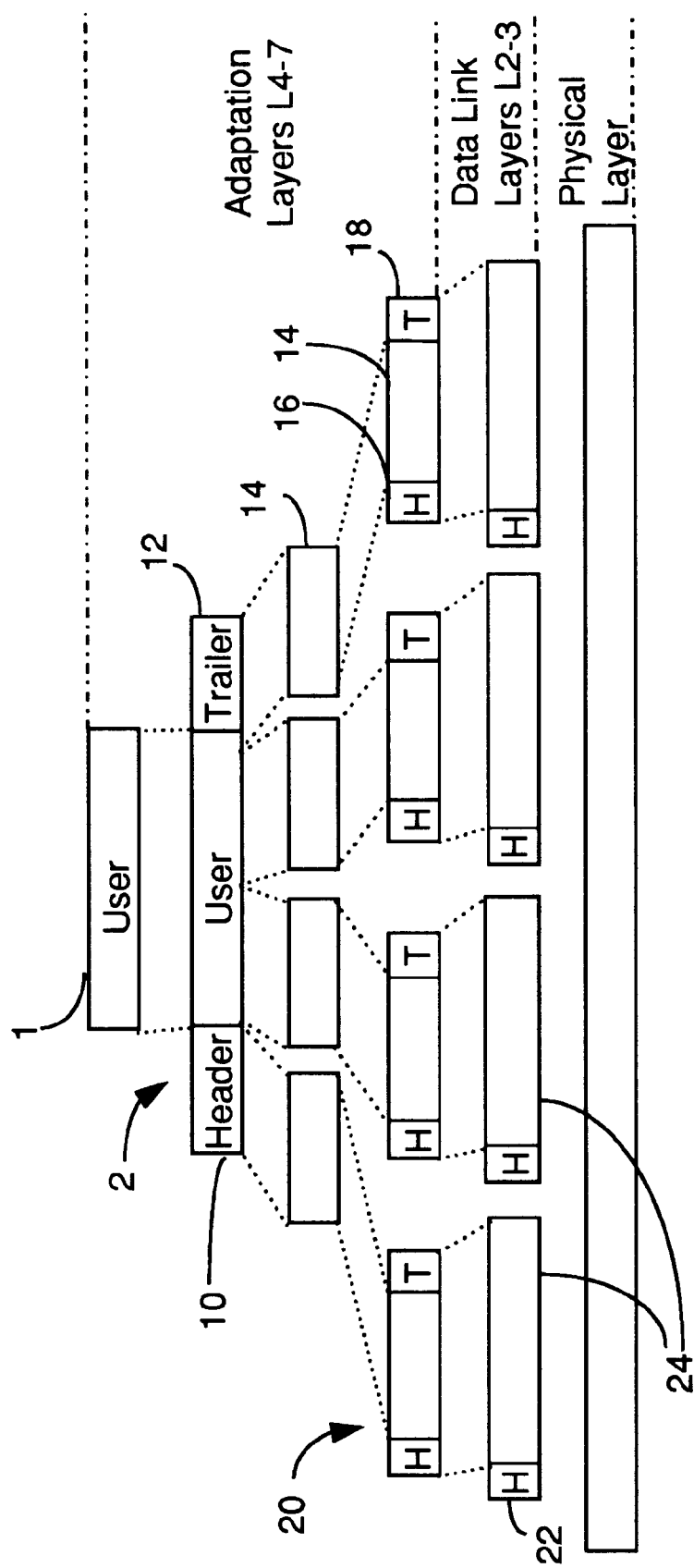
FIG. 1A shows the convergence and segmentation and reassembly functions of ATM (prior art)
Figure 1B:
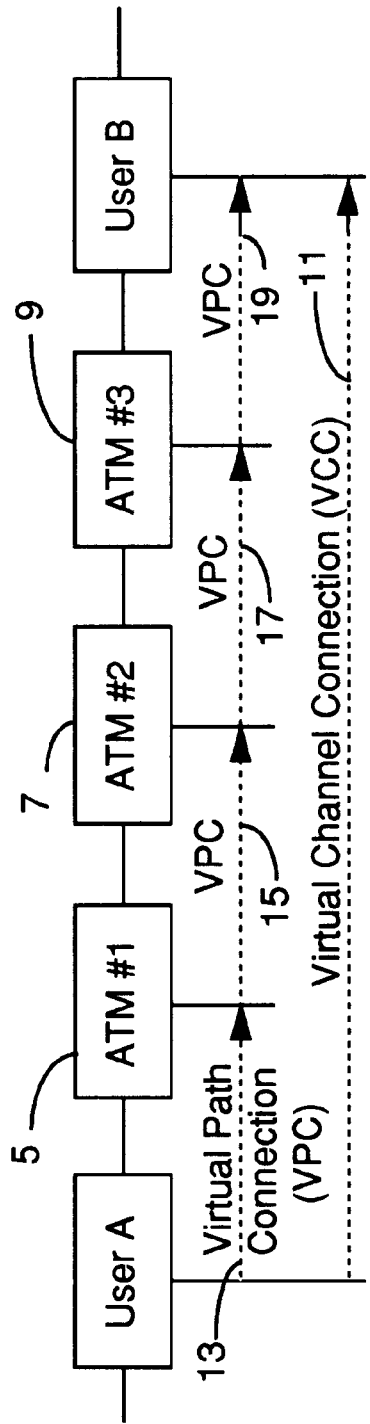
FIG. 1B shows an ATM network for defining the terms virtual channel and virtual path (prior art)
Figure 1C:
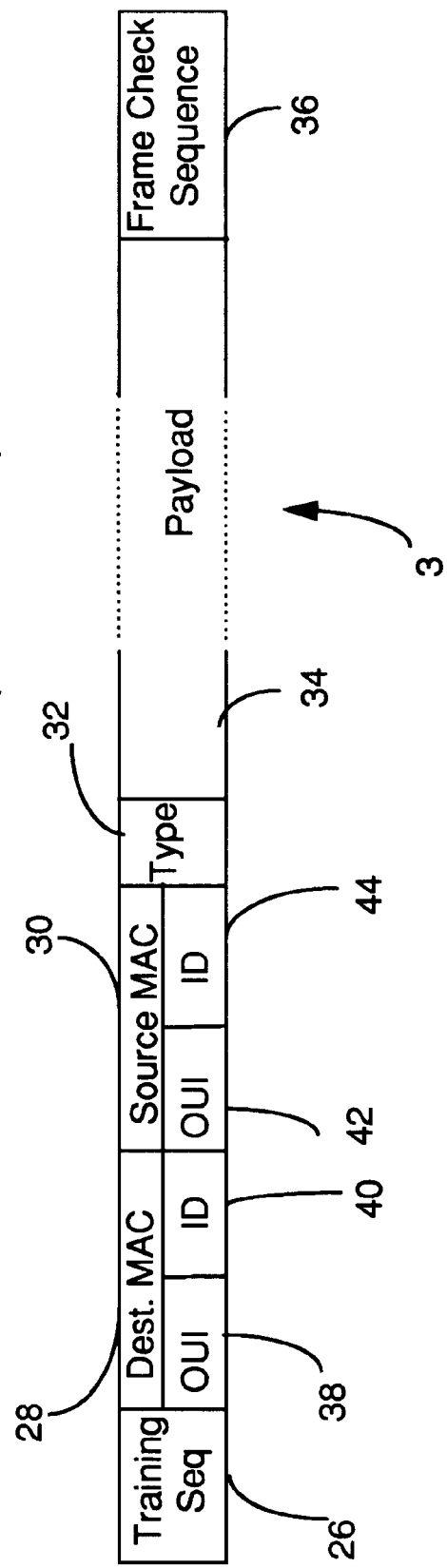
FIG. 1C shows an Ethernet frame (prior art)

FIGS. 1A, 1B, and 1C are provided for defining and illustrating some of the terms necessary for describing the present invention and its mode of operation.

FIG. 1A shows the convergence function, and the segmentation and reassembly (SAR) function of ATM. The convergence function is responsible for accepting the user traffic which could range from one to maximum 65,000 Bytes, and placing a header 10 and a trailer 12 around it to obtain a protocol data unit (PDU) 2. For this invention, the payload field of the PDU is limited to 1,500 bytes, which is the size of the Ethernet payload field. To push PDU beyond Ethernet limit of 1,500 bytes will require an additional header in the Ethernet frame. The length of the header and trailer is between 6 and 40 bytes. Once the header and the trailer have been added to the user payload, the traffic is segmented into 44–48 bytes data units 14. Next, the adaptation layer adds a header 16, and possibly a trailer 18 to the data unit 14, depending on the type of payload being supported. In any event, the final data unit from this operation is always a 48 octet block 20. Finally, the last operation is performed by the data link layer which adds a five-octet header 22 to the 48-octet payload 20 resulting in a 53 bytes cell 24. Each cell is transported over the physical layer between two ATM switches designated by the address information in header 22.

FIG. 1B shows a basic linear point-to-point ATM network configuration where the connections are identified through virtual channel identifiers (VCI) and virtual path identifiers (VPI) in the ATM cell header. Switching in the ATM network is illustrated at 5, 7, and 9. A virtual channel connection (VCC) 11 has end-to-end significance between end users A and B. A virtual path connection (VPC) has significance between adjacent ATM devices, 5, 7, and 9, and switching is performed very quickly through the use of a routing table.

FIG. 1C illustrates an Ethernet frame. Ethernet end stations are addressed globally and uniquely by the MAC address. Field 28 comprises the destination MAC and field 30 comprises the source MAC. The MAC address is has a 24 bit organizationally unique identifier (OUI) 38, 42 and a 24 bit end station identifier 40, 44.

A type field 32 is provided for specifying the traffic type.

The payload field 34 may comprise up to 1500 bytes. The frame begins with a training sequence 26 for allowing receiver synchronization and ends with a frame check sequence 36, for determining the integrity of the data in the frame.

FIG. 2 shows the block diagram of the system according to the invention. An E-Mux 21 exchanges ATM cells with an ATM UNI 27, which is connected in turn to an ATM network 23. E-Mux 21 is also connected to an Ethernet LAN 25 for exchanging frames. By convention, the traffic travelling from ATM network 23 to LAN 25 is defined by the term "incoming", and the traffic travelling from LAN 25 to ATM network 23 is defined by the term "outgoing".

According to the invention, a unique MAC OUI is established for extending ATM path addressing into the Ethernet MAC address domain. This unique MAC OUI identifies the traffic as ATM UNI. The ATM OUI is inserted in both the destination and the source MAC fields 38 and 42. The OUI field informs LAN 25 that the traffic is coming from a source not registered to it, so as to treat it accordingly. As indicated earlier, this permits the ATM traffic to coexist with traditionally addressed Ethernet traffic.

Figure 3A:
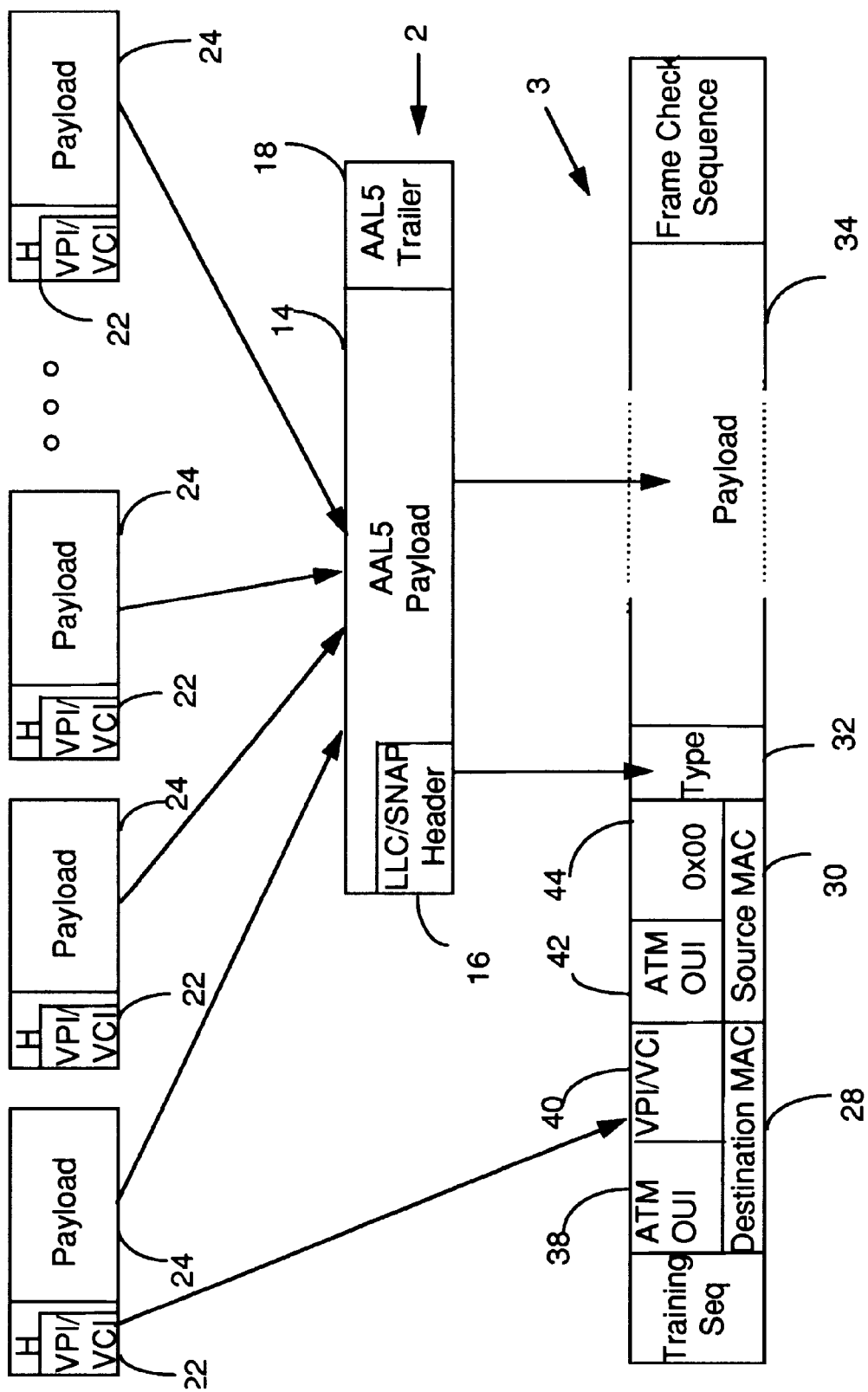
FIG. 3A shows the processing of the ATM cells to produce an incoming Ethernet frame.

E-Mux 21 associated to LAN 25 also requires a unique ID in the destination MAC, such that incoming traffic can be uniquely addressed to it. The ID could be for example VPI=0, VCI=0, which is never used in the ATM network 23. This unique address, ATM OUI, VPI=0,VCI=0, is mapped into the source MAC field 30 of an incoming frame and in the destination MAC of an outgoing frame. This is described next in connection with FIG. 3A, which shows the processing of the ATM cells to produce an incoming Ethernet frame and FIG. 3B, which shows the processing of an outgoing Ethernet frame to produce ATM cells.

Each end station has an VPI/VCI address for the ATM traffic used to establish connection between a switch in the ATM network and an end station through signalling in a known manner. For the incoming traffic, a flow of cells 24, addressed to an end station 39, 39', 39" in Ethernet network 25 is received at UNI 27 from network 23. The cells are assembled into a PDU 2 by SAR unit 29 of E-Mux 21.

PDU 2 comprises a AAL5 payload field 14 for receiving the payload from the incoming cells 24, the size of the payload field being limited to the maximum size of field 34 (up to 1500 bytes) of an Ethernet frame 3. Although the normal ATM AAL5 protocol data unit (PDU) is quite large, as discussed in connection to FIG. 1, it can be constrained to fit within the 1500 bytes of an Ethernet frame.

Since the size of the PDU is restricted to the payload field length of a frame, the cell segmentation function is performed by SAR 29 at boundary to the ATM network, such that the need for additional PDU information to be carried in the payload portion of the Ethernet frame is obviated. This differs from the cell-in-frame (CIF) approach in which the SAR function is performed at the end station, and then the cells are reassembled into Ethernet frames for transmission.

A PDU manager 31 strips the LLC/SNAP (Logical link control, sub-network attachment point) header of the PDU 2 and provides it to a header processor 37, which determines the type of the payload. The payload and the payload type are forwarded to a frame manager 33.

Frame manager 33 generates the Ethernet frame 3 by mapping the payload into field 34 and the payload type into field 32. Frame manager 33 also receives the address of the destination end station from an address processor 35, and maps this information into field 40 of destination MAC. This address is a concatenation of the VPI/VCI address extracted from the cell header 22. As well, address processor 35 maps the address of the E-Mux in the source MAC field 30, namely ATM OUI and VPI=0, VCI=0 in fields 40 and 42, respectively. As such, for the incoming traffic, the source MAC field of frame 3 comprises the address of the E-Mux, and the destination MAC comprises the address of the end station in the Ethernet.

Frame manager 33 sends frame 3 assembled as indicated above, over the Ethernet network 25. An interface 47 is provided for adapting the format of the frame to the connection medium of Ethernet 25.

In general, each "ATM aware" end station 39, 39', 39" is provisioned with an address controller, as shown at 41, 41', 41", which allows the end station to signal the network to request/accept connections. As well, address controller 41, 41', 41" provides the range of VPI/VCI values that could be assigned for such connections to the associated end station 39, 39', 39 to a defined subset of the whole VPI/VCIs allocated for UNI 27. An address controller 41, 41', 41" recognizes a destination ID as being its own, using a look-up table, and directs frame 3 to the associated end station 39, 39', 39".

For the outgoing direction, an end station 39, 39', 39" generates an outgoing frame 3, with the destination MAC indicating the ATM OUI address of E-Mux 21, rather than the address of another end station in the Ethernet network 25. As such, the corresponding Ethernet interface transmits the outgoing frame to E-Mux 21. The source MAC ID field 44 comprises the VCI/VCI address, of the destination ATM device in ATM network 23.

Now, frame manager 33 receives the frame from interface 47, segments the frame and provides the payload to PDU manager 31, the VPI/VCI address to address processor 35 and the type information from field 32 to header processor 37. PDU manager 31 generates a PDU 2 by inserting the payload received from frame manager 33 into field 14, and the type information from header processor 37 into LLC/SNAP header field 16. PDU is then forwarded to SAR 29 which segments the PDU 2 into cells 24, for UNI 27. Address processor 35 inserts the VPI/VCI address from the source MAC ID field 44 into each cell header, so that ATM network 23 switches the cell accordingly.

A simple example of this technique would be that end station 39 has established an ATM connection on VCI=5, VPI=7. For all traffic that is to be directed beyond the Ethernet onto the ATM network 23, end station 39 would set the destination MAC address in the Ethernet frame to that of the E-Mux 21, which is ATM-OUI, VPI=0, VCI=0, and would identify the virtual circuit via the source MAC, which will show ATM-OUI, VPI=7, VCI=5, identifying the source as the owner of that VCC. Traffic flowing in the direction from E-Mux 21 to end station 39, would see the source and destination addresses reversed.

As a simple extension of this concept, an Ethernet station, when originating signalling, may use the source MAC field for the normal Ethernet MAC and the destination MAC field for the ATM-OUI and '0'. The source MAC field permits an E-164 encoded NSAP to give the Ethernet connected end station a unique identification in the ATM network. In this way, the E-Mux can arbitrate and aggregate signalling onto a standard UNI from multiple Ethernet connected devices.

Additional overhead is eliminated by performing the ATM AAL5 protocol encapsulation at the E-Mux (e.g. normal protocol encapsulation for AAL5 as defined by RFC1483). Thus, an encapsulation of the cells into a PDU frame is effected by PDU manager 31, and an encapsulation of the PDU into an Ethernet frame is effected by the frame manager 33, such that the Ethernet end station does not have to be ATM protocol aware, or perform CRC (cyclic redundancy check) and SAR (segmentation and reassembly) functions.

Figure 4A:
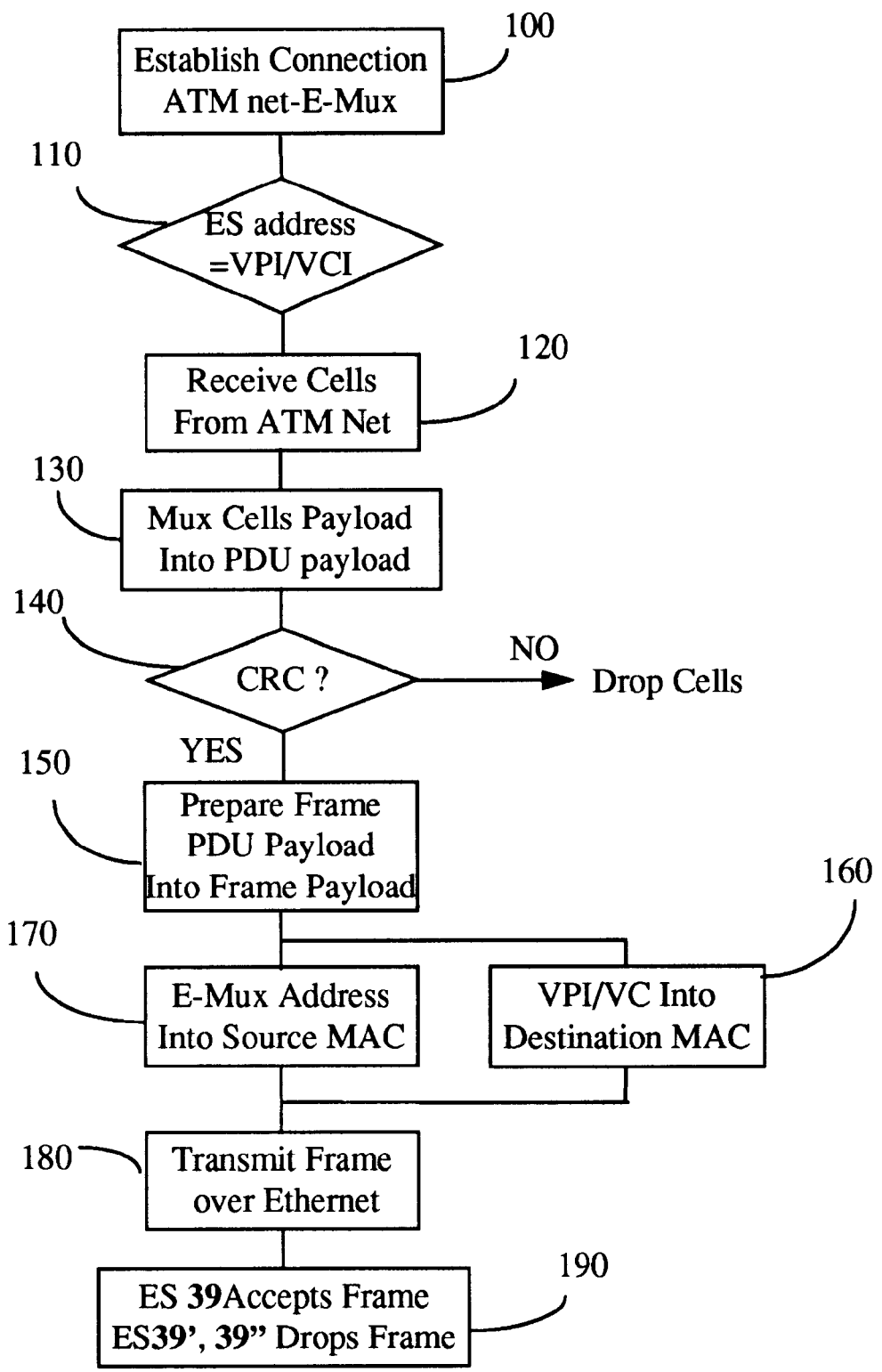
FIG. 4A is a the flow-chart illustrating the assembly of the ATM cells to produce an Ethernet frame.

FIG. 4A is a the flow-chart illustrating the processing of the ATM cells to produce an Ethernet frame. In step 100, a connection between the station in the ATM network and the E-Mux 21 is established based on the ATM address of the E-Mux. An address controller, lets say 41, recognizes its associate end station as the owner of the VPI/VCI, and station 39 establishes communication with ATM network 2, shown in step 110.

When E-Mux 21 receives a flow of ATM cells over a specific VC, as shown in step 120, it assembles the cells into a PDU, step 130, verifies that the AAL5 CRC is correct, in step 140, and maps the payload into the payload portion of the Ethernet frame in step 150. The destination MAC is set in field 28 to ATM OUI, VCI/VPI in step 160 to uniquely identify the owner of that particular path on the LAN, and the source MAC is set to that of the E-Mux, namely ATM OUI 0x00, in step 170.

The E-Mux broadcasts the Ethernet frame onto the Ethernet network in step 180. Station 39 with ID VPI/VCI in the destination MAC receives the frame, while other stations 39', 39" on the Ethernet, receive the frame and discard it as they are not addressed to them, as shown in step 190.

Figure 4B:
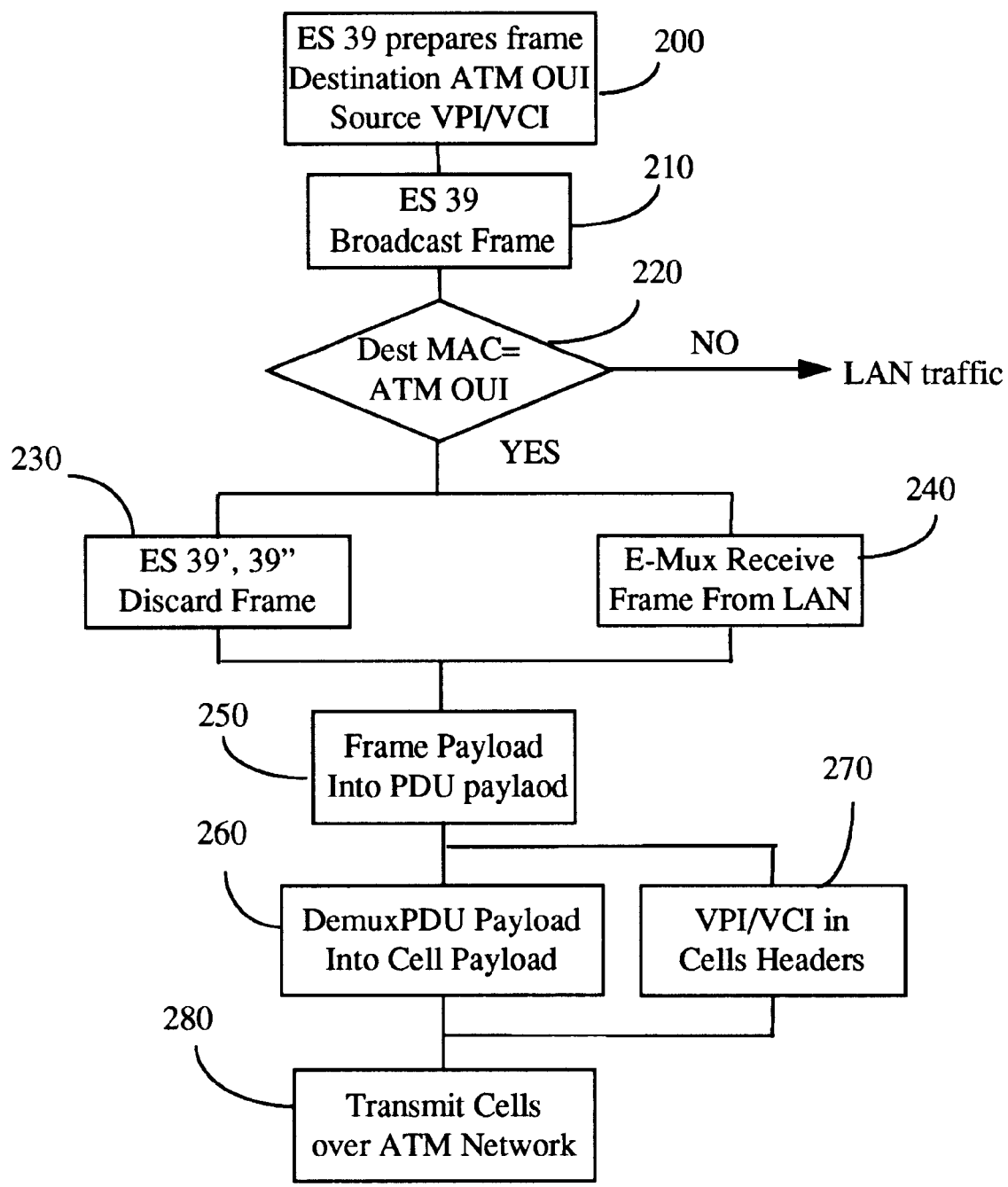
FIG. 4B is a the flow-chart illustrating the segmentation of the Ethernet frame to produce ATM cells.

FIG. 4B shows a the flow-chart illustrating the processing of an Ethernet frame to produce ATM cells.

First, in step 200, an end station, for example station 39 originates a message to be sent, for example, over VCI=5, VPI=7. It prepares an Ethernet frame as shown in FIG. 3B directed to the E-Mux by inserting the ATM OUI in fields 38 and 42, the VPI=0, VCI=0 address in the destination MAC field 40 and inserts the ATM virtual circuit address information in the source MAC address field 44.

In step 210, station 39 broadcasts the frame on the Ethernet. Other stations on the Ethernet receive the frame, check the destination MAC in step 220, and discard it in step 230, as they are not the addressed recipients of this frame.

E-Mux 21 receives the frame in step 240, and as the recipient, keeps the frame. It performs ATM AAL5 PDU and SAR processing on the payload steps 250 and 260, extracts the ATM virtual circuit address information from the frame source MAC and inserts it into the cells headers in step 270. The resulting cells are transmitted in step 280 over the address specified by the VPI/VCI address information.

Additional processing could be performed during processing of the cells from the Ethernet frames. For example, an Ethernet II/DIX format frame could be converted to RFC1483 encapsulation prior to AAL5 and SAR handling as an additional interworking step.

The invention may be used for providing ATM WAN (wide area network) access from a LAN. This permits a LAN connected computer to establish unique and private WAN connections, while maintaining access to all legacy services deployed on the non-ATM aware portions of the local LAN.

Use of Ethernet networks as a distributed multiplexer backbone over several shelves of equipment, permits an Ethernet to be used as the media to demultiplex an ATM UNI over a collection of devices distributed over a large area (e.g. up to 6000 feet for 10 BaseT). The typical application would see shelf and line card encoded in the ATM VPI/VCI addressing scheme to permit static de-multiplexing of the UNI.

Figure 5:
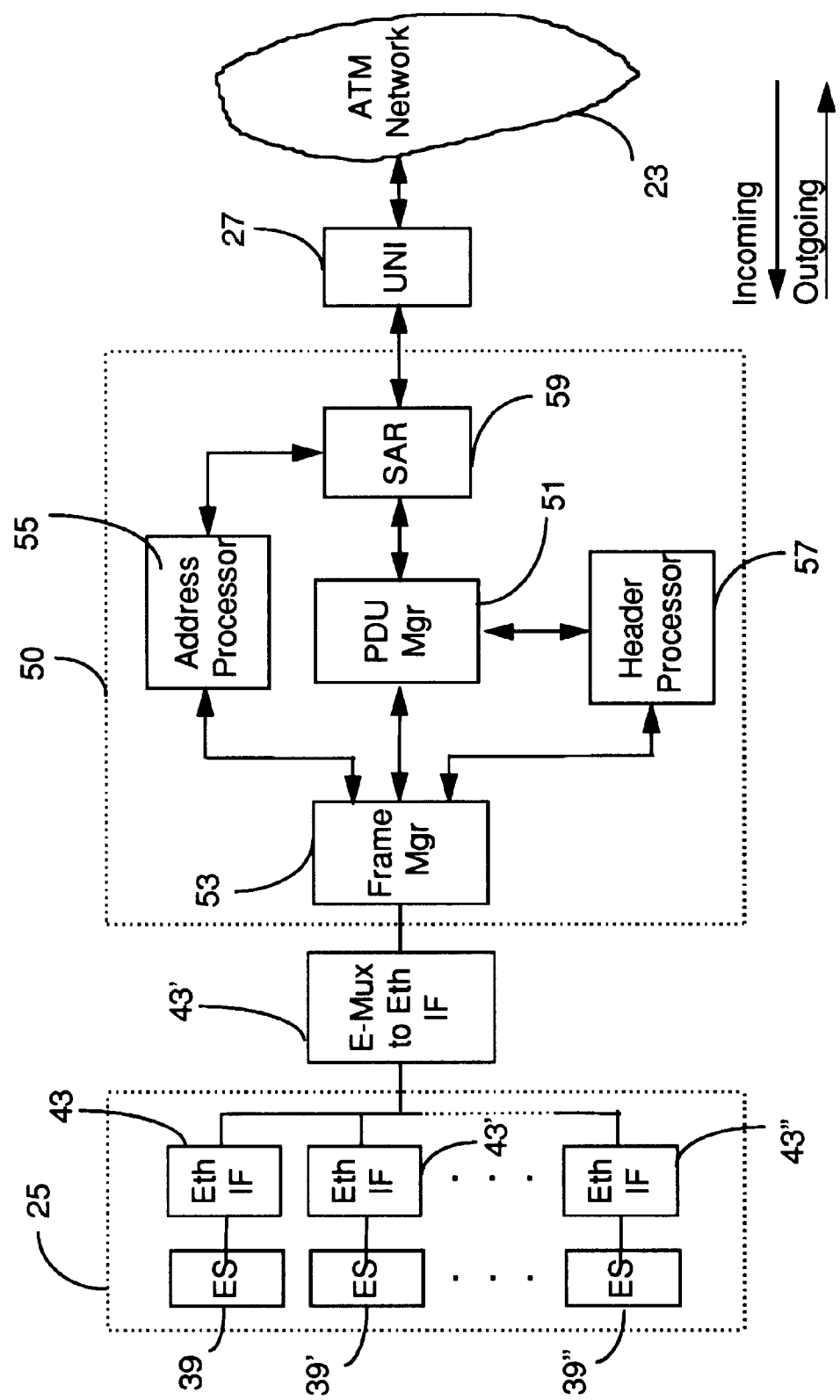
FIG. 5 shows the block diagram of a variant of the E-Mux.

A variation of the E-Mux of the invention can function as an ATM to Ethernet multiplexer, as shown in FIG. 5.

This variant provides for a highly scaleable and optionally redundant UNI termination for IP (Internet Protocol). The automated association of IP to VCI/VPI can be utilized to produce ATM interfaces for IP protocol based devices which can support significantly more virtual circuits than are currently available. This eliminates the requirement for the address controllers 41, 41', 41" residing in the attached end station 39, 39', 39". This also moves the IP→ATM association from the custom hardware in the Ethernet interface 43, 43', 43", to the traditional Ethernet ARP cache resident on the end station. Current ATM interfaces are limited to between 500 and 2000 VCs. This invention permits interfaces for relatively low bandwidth connections (as for an ATM based element management channel) to scale up to more than 50,000 virtual circuits.

Figure 6A:
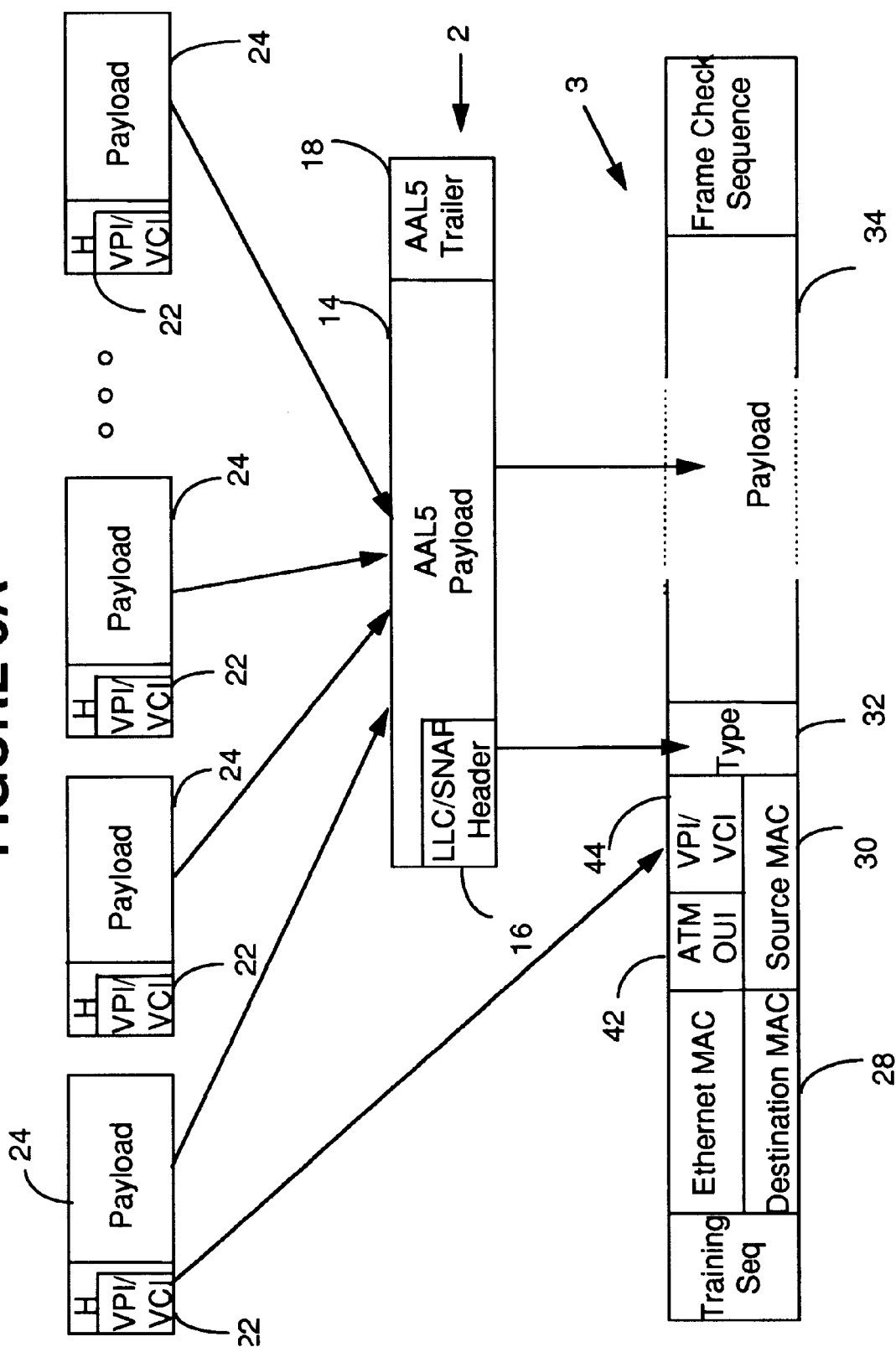
FIG. 6A shows the processing of the ATM cells to produce an incoming Ethernet frame according to the variant of FIG. 5.

In this case the E-Mux 50 assumes the OUI/VPI/VCI identifiers and the attached end station retains its normal MAC address. FIG. 6A shows the processing of the ATM cells to produce an incoming Ethernet frame and FIG. 6B illustrates the processing of an outgoing Ethernet frame to produce ATM cells, for E-Mux 50.

For the incoming traffic source OUI field 42 contains the ATM OUI to indicate to the end station that traffic comes from the ATM network 23. The VPI/VCI address form the cell header 22 is mapped by E-Mux 50 into the source ID field 44. The destination MAC field 28 comprises the Ethernet MAC of the station recipient of the respective frame.

Figure 6B:
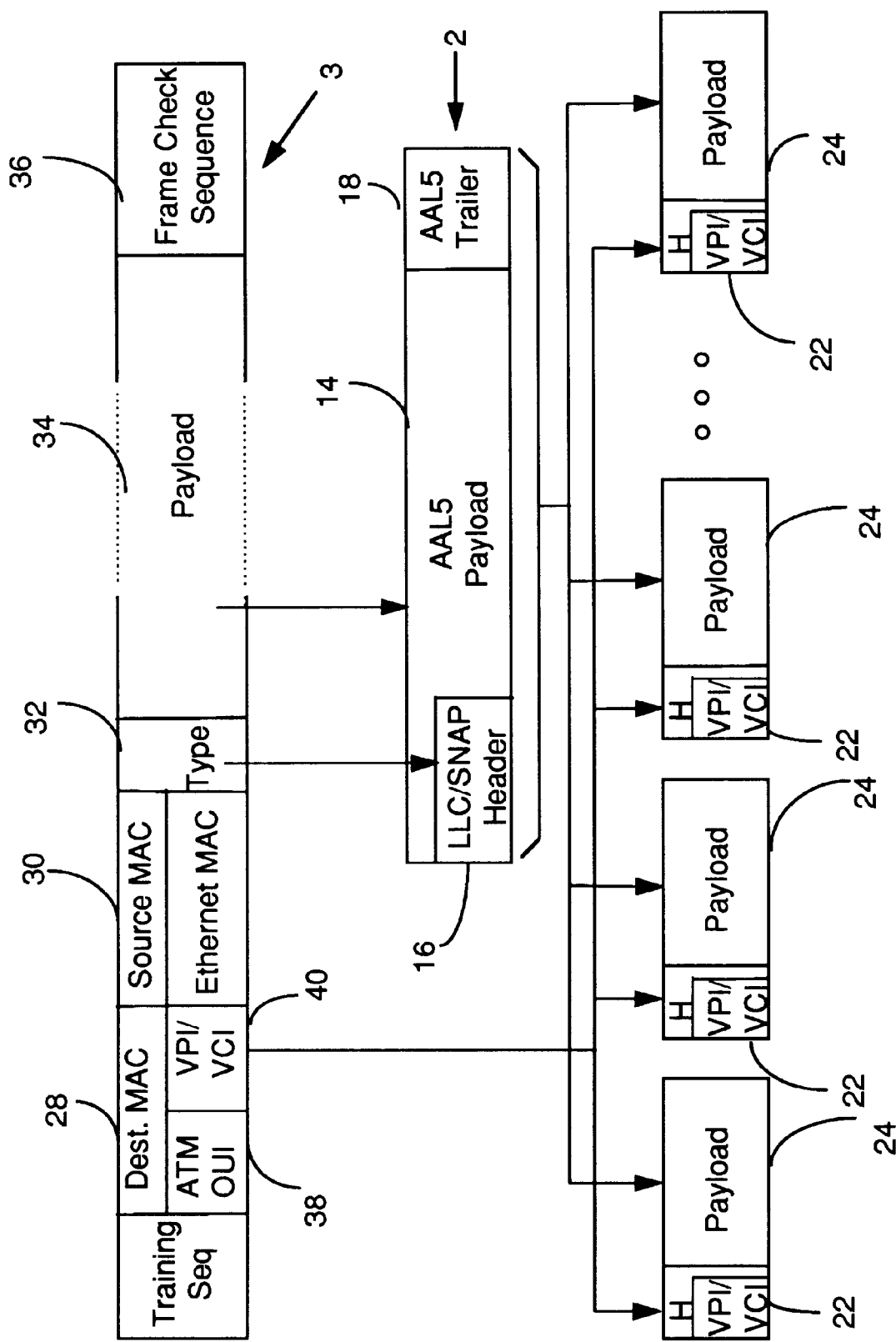
FIG. 6B shows the processing of an outgoing Ethernet frame to produce ATM cells according to the variant of FIG. 5.

For the outgoing traffic, FIG. 6B shows that the end station inserts the ATM OUI identification in field 38 of the destination MAC field 28 and the VPI/VCI address of the destination station in the ATM network 23 in field 40 of the destination MAC. The E-Mux 50 inserts the VPI/VCI address into the cell headers, so that the cells are switched accordingly in network 23. The source MAC field 30 comprises the Ethernet address of the end station in the Ethernet network that generated the respective frame.

There are numerous ways by which the embodiment of FIG. 5 can learn the Ethernet MAC address of the attached end stations. Alternatively, the Ethernet all-stations broadcast address can be used.

The generalized operation is that an attached end station learns the IP→MAC association for devices remotely connected to the ATM network as it would for a normal Ethernet. However, the MAC addresses presented actually contain VPI/VCI information by which those devices can be reached. The attached host is "spoofed" into having an Ethernet layer 2 address mapping for ATM connected devices such that Ethernet address resolution and forwarding mechanisms make ATM attached devices reachable.

This invention can also be used to provide hot standby backup platforms. Normally an ATM connection is unique and cannot automatically be locally switched to another platform. The availability of Ethernet as a broadcast medium permits the ATM traffic to be fanned out to multiple devices simultaneously and only acted upon by the current "active" platform.

While the invention has been described with reference to particular example embodiments, further modifications and improvements which will occur to those skilled in the art, may be made within the purview of the appended claims, without departing from the scope of the invention in its broader aspect.

We claim:

1. A multiplexer (E-Mux) for encapsulating ATM cells into a LAN frame, comprising:
   a segmentation and reassembly unit for receiving a plurality of incoming ATM cells with a LAN destination address, and generating an ATM adaptation layer 5 (AAL5) protocol data unit (PDU);
   a PDU manager for receiving said AAL5 PDU and extracting an AAL5 payload;
   a header processor for extracting a traffic type indicator from the header of said PDU;
   an address processor for extracting said LAN destination address from the header of an incoming ATM cell; and
   a frame manager for receiving said traffic type indicator, said AAL5 payload and said LAN destination address and generating an incoming LAN frame.

2. A multiplexer as claimed in claim 1, wherein said LAN is an Ethernet network and said incoming LAN frame is an Ethernet frame.

3. A multiplexer (E-Mux) for segmenting a LAN frame into a plurality of ATM cells, comprising:
   a frame manager for receiving an outgoing LAN frame with an ATM destination address and de-assembling it into a traffic type indicator, an AAL5 payload and an ATM destination address;
   a header processor for receiving said traffic type indicator from said frame manager;
   a PDU manager for receiving said AAL5 payload and said traffic type indicator and generating an ATM adaptation layer 5 (AAL5) protocol data unit (PDU);
   an address processor for receiving said ATM destination address from said frame manager; and
   a segmentation and reassembly unit for receiving said PDU and said ATM destination address generating a plurality of ATM cells with said ATM destination address.

4. A multiplexer as claimed in claim 3, wherein said LAN is an Ethernet network and said outgoing LAN frame is an Ethernet frame.

5. A multiplexer as claimed in claim 2, further comprising:
   an E-Mux-to-Ethernet interface for formatting said Ethernet frame for transmission over the connection medium of an Ethernet network; and
   an ATM-to-E-Mux interface for formatting said ATM cells received from an ATM network for processing by said E-Mux.

6. A multiplexer as claimed in claim 4, further comprising:
   an E-Mux-to-ATM interface for formatting said ATM cells for transmission over the medium of an ATM network; and
   an Ethernet-to-E-Mux interface for formatting said Ethernet frame received over a transmission medium of an Ethernet network for processing by said E-Mux.

7. An Ethernet network comprising a plurality of end stations and an Ethernet/ATM interface connected over a transmission medium, each end station comprising an address controller for forwarding an incoming LAN frame received from said Ethernet/ATM interface ATM network to said end station when a destination address comprised in the destination MAC field of said frame is recognized by said address controller, and for inserting an ATM destination address into the source MAC field of an outgoing frame destined to said Ethernet/ATM interface.

8. A telecommunication network comprising a LAN with a plurality of end-stations connected over a transmission medium and an ATM network, comprising:
   a multiplexer (E-Mux) for encapsulating a plurality of incoming ATM cells received from said ATM network into an incoming LAN frame and for segmenting an outgoing LAN frame received from said LAN network into a plurality of outgoing ATM cells;
   an E-Mux-to-LAN interface for formatting said incoming LAN frame for transmission over the connection medium of said LAN network, and for formatting said outgoing Ethernet frame received over the connection medium of said LAN network for processing by said E-Mux;
   an ATM-to-E-Mux interface for formatting of said incoming ATM cells received from said ATM network for processing by said E-Mux, and for formatting said outgoing cells for transmission over the medium of said Ethernet network; and
   an address controller at each end station for forwarding said incoming LAN frame to said end station when a destination address comprised in the destination MAC field of said incoming LAN frame is recognized by said address controller, and for inserting an ATM destination address into the source MAC field of said outgoing LAN frame, when said outgoing LAN frame is destined to said ATM network.

9. A method for transmitting information from an ATM network to an Ethernet network using an E-Mux performing the steps of:
   establishing connection between an ATM switch of said ATM network and an end station of said Ethernet network based on a VPI/VCI destination address in the header of an incoming ATM cell;
   receiving a plurality of incoming ATM cells with said destination address, and generating an ATM adaptation layer 5 (AAL5) protocol data unit (PDU);
   extracting an AAL5 payload from said PDU;
   extracting a traffic type indicator from the header of said PDU;
   generating an incoming Ethernet frame using said traffic type indicator, said AAL5 payload and said destination address; and
   transmitting said Ethernet frame over said Ethernet network to said end station according to said destination address.

10. A method as claimed in claim 9, wherein said incoming Ethernet frame comprises:
    a destination MAC field including:
       a unique ATM OUI identifier indicating that said incoming Ethernet frame comprises ATM traffic; and
       said VPI/VCI destination address specifying the address of said end station;
    a source MAC field including:
       said ATM OUI identifier indicating that said incoming Ethernet frame comprises ATM traffic; and
       a unique address of said E-Mux.

11. A method for transmitting information from an Ethernet network to an ATM network using an E-Mux performing the steps of:
    establishing connection between an end station of said Ethernet network and an ATM switch of said ATM network based on a VPI/VCI destination address provided by said end station;
    generating an outgoing Ethernet frame at said end station and transmitting said frame to said E-Mux;

extracting from said Ethernet outgoing frame a traffic type indicator, a frame payload and a source address;

generating an ATM adaptation layer 5 (AAL5) protocol data unit (PDU) from said frame payload and a traffic type indicator extracted from the type field of said outgoing frame; and segmenting said PDU into a plurality of outgoing ATM cells and inserting a VPI/VCI destination address in the header of said cells from an address processor.

12. A method as claimed in claim 11, wherein said outgoing Ethernet frame comprises:

a destination MAC field including:
   a unique ATM OUI identifier indicating that said outgoing Ethernet frame comprises ATM traffic; and
   a unique address of said E-Mux;

a source MAC field including:
   said ATM OUI identifier indicating that said outgoing Ethernet frame comprises ATM traffic; and
   said VPI/VCI destination address specifying the address of said ATM cell.

* * * * *